United States Patent [19]

Dimmick et al.

[11] Patent Number: 4,899,573

[45] Date of Patent: Feb. 13, 1990

[54] APPARATUS AND AN ASSOCIATED METHOD FOR LEAK AND VOLUME INSPECTION OF CONTAINERS

[75] Inventors: Henry M. Dimmick, Butler; Richard A. Spryn, Fenelton, both of Pa.

[73] Assignee: American Glass Research, Inc., Butler, Pa.

[21] Appl. No.: 315,530

[22] Filed: Feb. 24, 1989

[51] Int. Cl.[4] .............................................. G01M 3/32
[52] U.S. Cl. ...................................... 73/49.2; 73/149
[58] Field of Search ................ 73/49.2, 45, 45.1, 45.2, 73/149, 37

[56] References Cited

U.S. PATENT DOCUMENTS

| | | | |
|---|---|---|---|
| 2,849,881 | 9/1958 | Anderson | 73/149 X |
| 3,028,750 | 4/1962 | Rondeau | 73/49.2 |
| 3,060,735 | 10/1962 | Baker | 73/149 |
| 3,075,382 | 1/1963 | Mathias | 73/149 |
| 3,113,448 | 12/1963 | Hardway et al. | 73/1 |
| 3,241,361 | 3/1966 | Broughton | 73/149 |
| 3,527,909 | 9/1970 | Torre | 200/83 |
| 3,921,436 | 11/1975 | Piegat | 73/40 |
| 4,083,228 | 4/1978 | Turner et al. | 73/32 |
| 4,686,638 | 8/1987 | Furuse | 73/49.2 X |

FOREIGN PATENT DOCUMENTS 665391 6/1963 Canada ............................ 73/49.2
2907234 9/1980 Fed. Rep. of Germany ....... 73/49.2

OTHER PUBLICATIONS

Sensors, Determination of Small Leaks in Large Pressurized Volumes, Gibson, Sep., 1988, pp. 67–70.

Primary Examiner—John Chapman
Assistant Examiner—Joseph W. Roskos
Attorney, Agent, or Firm—Arnold B. Silverman

[57] ABSTRACT

The present invention provides apparatus and an associated method for testing containers for volume and leaks by employing a pump which provides rapid pressurized pulses simultaneously to a container being tested and a standard volume which may be a container. Acoustic impedance materials are interposed between the pump and the two containers to isolate the containers from each other. A differential pressure monitor is interposed between the two containers to provide output to electronic processing apparatus which may serve to either determine (a) solely if a leak exists or (b) in the alternative if no leak exists to determine whether the desired volume is present within the container.

44 Claims, 4 Drawing Sheets

APPARATUS AND AN ASSOCIATED METHOD FOR LEAK AND VOLUME INSPECTION OF CONTAINERS

BACKGROUND OF THE INVENTION

1. Field of the Invention

This invention relates to apparatus and an associated method for inspecting containers for leakage and if desired to determine if the volume is as desired.

2. Description of the Prior Art

The inspection of containers in order to confirm that they have the desired volume and do not leak can be extremely important to both manufacturers of containers and those who fill the containers with products to be sold.

Leaking containers not only can result in undesired loss of or contamination of the product contained therein, but also can result in the product which is leaking out of the container damaging or destroying other property or injuring people.

It is also very important to manufacturers that a container have the proper volume in order that it will hold the labeled amount of product. Even if there are volume variations, the product manufacturer generally desires to have all of the containers filled to nearly the same height. Departures from a predetermined range of desired volume capacities can interfere with this objective.

It has been known to measure volume of a container using gravimetric means wherein an empty container is weighed and the container is then filled with water and weighed again. Assuming that the water is of known temperature and is free of dissolved air, one may easily calculate the volume of the container. This approach, however, is too time consuming for use in rapid inspection of containers and is susceptible to human error.

It has also been known to compare a container of unknown volume or test container to another of the same nominal size and shape which has had its volume measured carefully by gravimetric means. One of the problems with such an approach is that measurements can be in error if the test containers are a few degrees above or below the ambient temperature. Further, such systems are less accurate when the containers are wet as through condensation. In addition, the test can take several tenths of a second to perform which means that only about 100 containers can be tested per minute.

It has also been known to seek to detect leaks in containers by employing pressure-decay techniques. In such an approach, a known pressure is applied to a container and the container is sealed. If a leak is present, the pressure in the sealed container will decrease over time. A pressure transducer may be used to measure the size of the leak. Such approaches require either long decay times, or if small leaks are to be detected, the use of high pressure. U.S. Pat. No. 3,527,909 discloses a differential pressure switch which is said to be useful in leak testing. This patent illustrates a conventional pressure-decay system.

It has been known to employ Boyle's law in inspecting containers under isothermal conditions. See generally, U.S. Pat. Nos. 3,060,735 and 3,113,448.

U.S. Pat. No. 3,075,382 discloses the use of a single pressure source and two volumes and a continuous pressure fluctuation which in this instance is an acoustical device in measuring volume. This system also will be limited by temperature variations as the velocity of sound is dependent on air temperature. This patent also contains an allusion to use of the apparatus as a means for determining the presence of a leak at the seal between the apparatus and the container. U.S. Pat. No. 3,241,361 also discloses an isothermal method of measuring volume. This system discloses the use of a static pressure source and a manual pressure balance. See also U.S. Pat. No. 4,083,228.

U.S. Pat. No. 3,921,436 discloses leak testing apparatus for inspecting automotive heat exchangers. This system employs reference and test objects of similar shapes and says that they are to be maintained at the same temperature. See also U.S. Pat. No. 4,686,638 which discloses the use of a moving average technique to minimize the effects of temperature fluctuations. This patent also points out the difficulty of attempting to employ an isothermal system under non-isothermal conditions which frequently exist in plant environments.

U.S. Pat. No. 2,849,881 discloses the use of a continuously operating pump and servo-balance system for balancing pressure between two sides of the system in measuring liquid quantity in a closed tank. A pair of pneumatic resistors are positioned between the closed volume and the closed space. The system contemplates isothermal operation.

In spite of the foregoing prior art disclosures, there remains a very real and substantial need for a rapid means for determining whether a container leaks and if its volume corresponds to a desired predetermined volume, particularly in view of the practical difficulty of maintaining isothermal conditions.

SUMMARY OF THE INVENTION

The present invention has met the above-described needs.

The apparatus of the present invention provides pump means for applying pressure as by a single rapid pulse to the interior of the container being tested and to a volume standard means which may be a standard container. First and second conduit means which connect the pump means with the respective containers have acoustic impedance means which serve to isolate the containers in order to permit the buildup of differential pressure. Differential pressure sensing means associated with the containers provide output signals which are a function of the pressure differential. Processing means receive the signals and determine whether a leak exists.

In some embodiments, if the leak does not exist, a volume determination is made.

The pump preferably produces a pulse which establishes a generally triangular wave form when plotting differential pressure against time. By analyzing the differential pressure at a predetermined time one may obtain a reading as to whether the test container has a leak. If a leak does not exist, analyzing the differential pressure at a time prior to the predetermined time will provide a reading as to whether the test container has the desired volume.

The pump pulses at such a rapid rate that the tests are performed under adiabatic conditions and many containers may be tested in a short time.

It is the object of the present invention to provide an apparatus and an associated method for testing containers for leaks under adiabatic conditions.

It is a further object of the present invention to provide such apparatus and method which are capable of making a determination as to whether a container being tested has the desired volume.

It is a further object of the present invention to provide such a system which will perform a volume test under adiabatic conditions.

It is a further object of the present invention to provide apparatus which may function both as a leak detector and volume detector.

It is another object of the present invention to provide such a system which will yield accurate readings at a very high rate of speed.

It is another object of the invention to provide such a system wherein the presence of small quantities of moisture, as by condensation, will not have any substantial adverse effect on the results.

It is a further object of the present invention to provide such a system wherein the pump stroke length and duration may be adjusted to test different size containers.

It is yet another object of the present invention to provide such a system which is leak free, and has low acoustical noise.

These and other objects of the invention will be more fully understood from the following description of the invention on reference to the illustrations appended hereto.

DESCRIPTION OF THE PREFERRED EMBODIMENTS

The present invention is adapted to test for container leakage and volume at a very high rate of speed under adiabatic conditions. While it will be appreciated that the apparatus and method may be employed on a wide variety of containers composed of a variety of materials, a prime utility contemplated would be for containers made of glass, plastic and metal as well as combinations thereof which are being inspected at the rate of about 50 to 400 per minute and may have a volume of about 1 to 70 fluid ounces.

Figure 1:
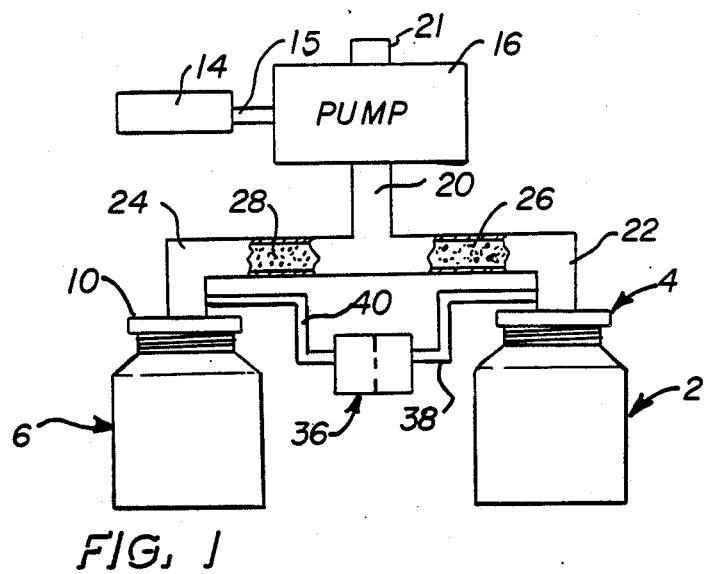
FIG. 1 is a schematic illustration of one embodiment of the test apparatus of the present invention.

Referring to FIG. 1, there is shown a test container 2 of unknown volume in sealing contact with a resilient annular disk 4. As a reference for the volume comparison a volume standard which in the form shown is a container 6 of generally identical shape and of the desired volume is in sealing contact with a resilient annular disk 10. The contact between the resilient sealing disk 4 and the container 2 is preferably such that a conveyor transporting a series of containers to be inspected may cause the container to be in sealing engagement with the disk 4 for the duration of a pump pulse by any conventional or desired means as by vertical reciprocation of the disk 4 at a rapid rate which is indexed with respect to container movement. As such systems are well known to those skilled in the art, the details of the same need not be provided herein.

A stepper motor 14 through a rack and pinion (not shown) causes the pump 16 to reciprocate responsive to rotational movement of the stepper motor 14 output shaft 15 and create pressure pulses of a very short duration on the order of about 20 to 100 milliseconds, for example. The pump 16 may advantageously be of the constant displacement type. The pump outlet 20 is in communication with both first conduit means 22 which connects the pump with test container 2 and second conduit means 24 which connects the pump with standard or reference container 6. In this manner, output of the pump 16 will simultaneously provide a pressure pulse to both containers 2, 6. It is preferred that a very small leak open to the atmosphere be incorporated in the pump at 21. This serves as a vent to make the system relatively insensitive to long term (of the order of tens of seconds or longer) ambient pressure changes.

Disposed respectively within first conduit means 22 and second conduit means 24 are acoustic impedance means 26, 28 which serve to separate pressure to the two containers 2, 6 in order that a differential pressure can be obtained and measured. It will be appreciated that without the acoustic impedance means 26, 28, no differential pressure can be present in the system irrespective of the volumes of containers 2, 6. The acoustic impedance means 26, 28 serve to isolate container 2 from container 6 and allow the existence of a differential pressure between them. Among the preferred materials for this purpose are glass beads which are adhesively bonded to each other as by epoxy. The beads may, for example, have a diameter of about 0.020 to 0.025 inch. It is preferred that the conduit means 22, 24 have a maximum dimension of about one-half to three quarters inch. The epoxy bonded bead assembly may be a plug which fills an axial portion of the interior of conduit means 22, 24. The plug may have a diameter of about one half to three quarters inch and a length of up to three eighths inch with a maximum pore size of about 175 microns. Such materials are preferred as they add no acoustic noise to the system.

A suitable material for use as the acoustic impedance means are bonded spherical beads having a network of interstitial pores of generally uniform size such as those available under the trade designation EP Brand Porous Structures (Grade 175) by Eaton Products International, Inc. of Birmingham, Mich.

In order to make determinations of whether the volume is the desired amount by comparing the pressure differential between containers 2 and 6 and also whether there is a leak in container 2, differential pressure measuring means 36, which preferably is a differential pressure transducer, is operatively associated with each of the containers 2, 6. In the form shown a conduit 38 connects first conduit means 22 with the differential pressure measuring means 36 and a conduit means 40 connects differential pressure measuring means 36 with second conduit means 24. It is noted that these connections are each made between the acoustic impedance means 26, 28 and the containers 2, 6. This positioning of the connections downstream of the acoustical impedance means 26, 28 permits the apparatus to provide an accurate reading of the pressure differential between containers 2, 6. The differential pressure measuring means 36 in a manner to be described hereinafter emits an electrical signal which is proportional to the differential pressure. This signal is received by electronic processing means which evaluates the pressure differential in the form of a voltage curve and effects a comparison to determine whether the container meets the predetermined standards in respect of leakage and volume. The output of this electronic processing means may be visually displayed, may be stored or may be employed to physically remove a defective container through reject mechanisms.

Figure 2:
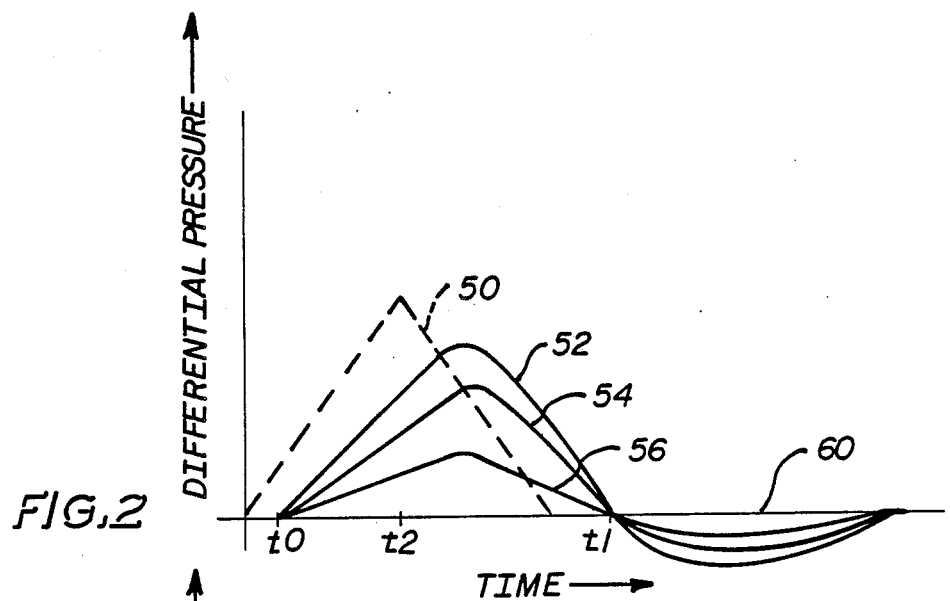
FIG. 2 is a plot of differential pressure against time.

Referring to FIG. 2, there is shown a plot of differential pressure versus time with particular references to three points in time t0, t1, t2. The differential pressure measuring means 36 has converted the mechanical pressure differential into an electronic voltage equivalent. It will be seen that the dotted plot 50 shows the pump displacement during a pulse which is generally triangular in shape. It is this relationship which contributes to the ability of the equipment in this system employing rapid pump pulsing, with one pulse being used for each container tested, that enables an accurate and rapid determination regarding leakage and volume.

In isothermal processes such as in the prior art it was required that the gas and apparatus be at substantially the same temperature, otherwise, incorrect readings of volume and leakage would be obtained. The present invention employs such rapid changes in pressure and volume that no substantial heat is lost or gained from the walls of the apparatus and it is, therefore, an adiabatic process. In an adiabatic process, the gas law for air is $(P_1V_1)^{1.4} = (P_2V_2)^{1.4}$ wherein $P_1$ and $P_2$ are pressures before and after the pump stroke and $V_1$ and $V_2$ are the respective volumes before and after the pump stroke. As no heat is exchanged between the gas and the substantial apparatus, temperature is not employed in this relationship. It is contemplated with the present invention that there will be no substantial flow of heat as a result of the rapid pulsing of the pump each pulse of which may be on the order of about 20 to 100 milliseconds in duration.

Each of the generally triangular plots 52, 54, 56 represents a container having different volume departures from the standard. If the departure in volume between the test container and the standard volume reference were zero, the value of differential pressure would be zero and the plot would be along the time axis 60. As will be seen in FIG. 2, the greater the difference in volume between containers 2, 6, the higher the amplitude of the apex of the triangle. Curve 52 represents the largest difference in volume, curve 56 the minimum, and curve 54 an intermediate difference in volume.

Referring still to FIG. 2, it will be appreciated that the initiation of the volume curves occurs at time t0 and the return to a zero value is at a predetermined time t1. By measuring the amplitude of the pressure differential at a time t2 which may be any time between t0 and t1 one may determine whether there has been a departure from the desired volume. It is this approach which permits the electronic determination of whether a container passes or fails the inspection.

As shown in FIG. 2 and considering the leak detection aspect of the present invention, it will be noted that all of the curves 52, 54, 56 which have a departure from the desired volume pass through the time axis at the identical time t1.

Figure 3:
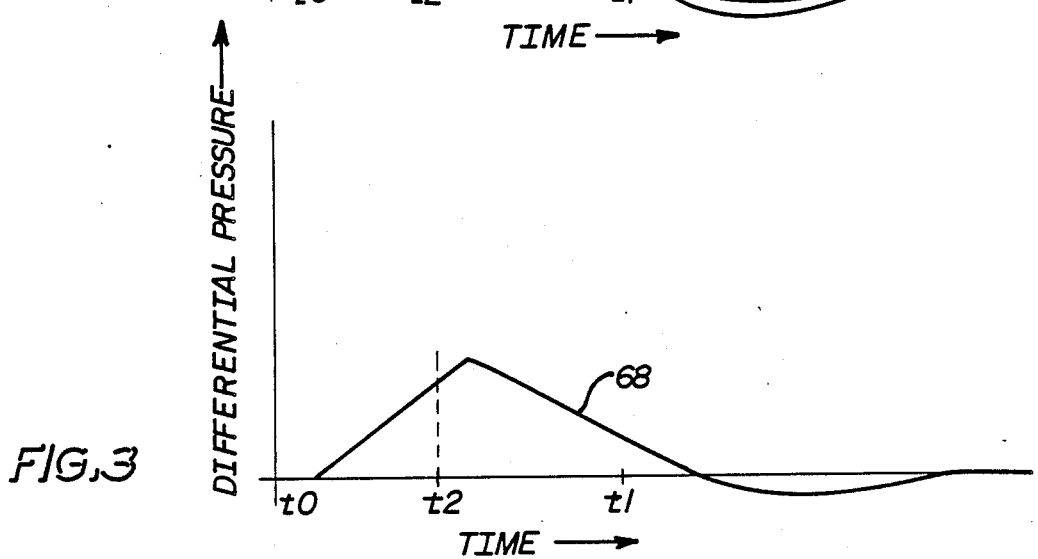
FIG. 3 is a plot of differential pressure against time in a situation where the container has a leak.

Referring to FIG. 3, there is shown a generally triangular curve 68 representative of the pressure differential between containers 2 and 6 of FIG. 1. It will be noted that the curve meets the time axis at a time later than t1. At time t1, if the pressure differential as shown by curve 68 is zero, there is no leak present in the test container 2. If as is shown in FIG. 3, the value of the curve 68 at time t1 is greater than zero, the container has a leak. Obviously, if the container has a leak, the pressure differential between containers 2 and 6 will be a positive number and a plot 68 which is a voltage reading related to differential pressure provides this information.

Referring still to FIG. 3, if there is a leak present, the voltage at time t2 is a function of the size of the leak. On the other hand, if no leak were present and the value of curve 68 at time t1 were to be zero, the value of the curve 68 at t2 would then be interpreted as a volume signal indicating the difference in volume between test container 2 and volume standard means or standard container 6.

It will be appreciated, that as a result of this relationship one may in a vary rapid manner make an initial determination as to whether a leak is present and if so employ the time t2 which is prior to the predetermined time t1 to make a determination of the magnitude of the leak, but if no leak exists, the magnitude of the curve 68 indicates the difference in volume between the two containers 2, 6.

Figure 4:
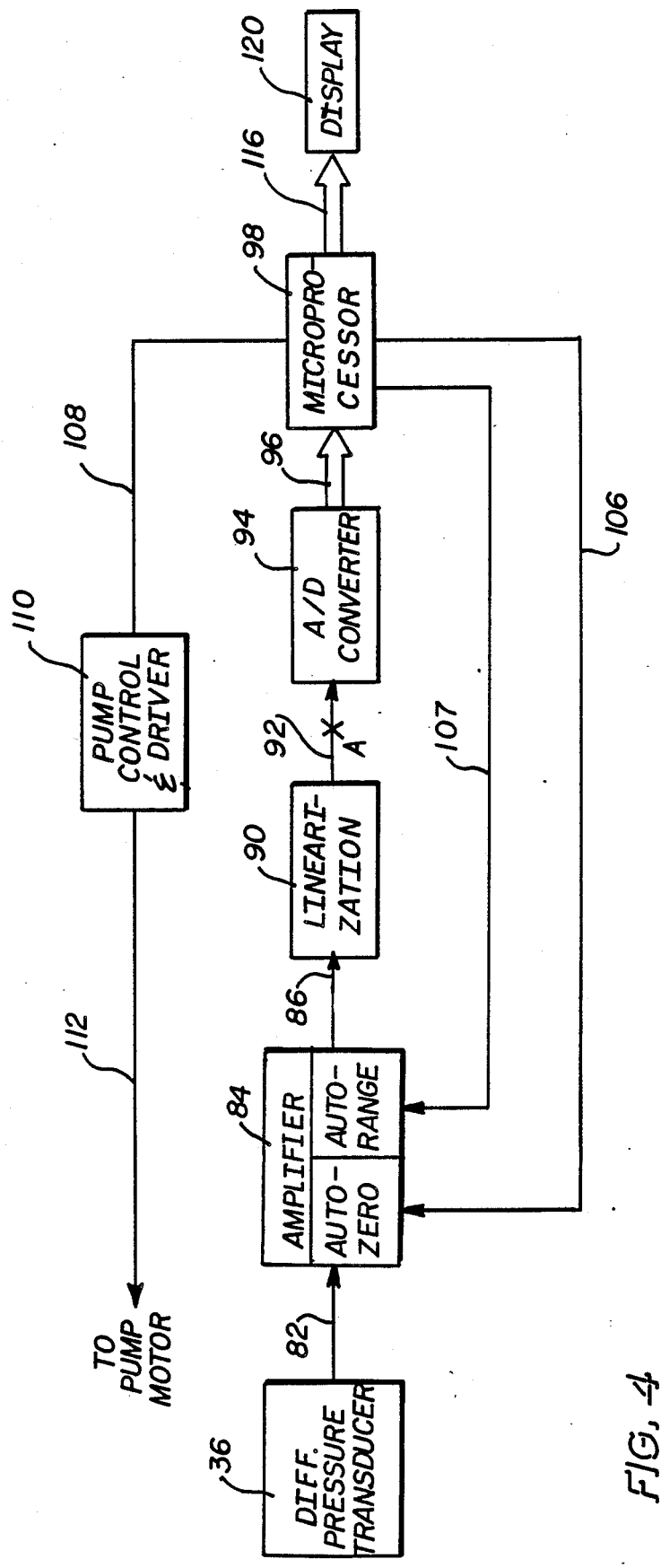
FIG. 4 is a schematic illustration of a preferred form of electronic processing means of the invention.

Referring now to FIG. 4, electronics useable in the electronic processing means which receives signals from the differential pressure measuring means 36 will be considered. The differential transducer 36 emits a signal over lead 82 to amplifier 84 which amplifies the signal and establishes zero restoration as the transducer does not provide zero output for zero differential pressure. Zero restoration also corrects for temperature or other offsets in the early operational amplifier stages. The signal is linearized at block 90 by an exponential function generator or other electronic means well known to those skilled in the art with the output going over lead 92 to analog to digital converter 94 which in turn provides its output over lead 96 to microprocessor 98. The microprocessor 98 which may be programmed by means readily known to those skilled in the art, provides signals over lead 106 and 107 to amplifier 84 as described hereinafter. Microprocessor 98 also emits a signal over lead 108 to initiate action by the pump controller 110 which then emits signals to pump motor 14 over lead 112 to be described in greater detail hereinafter. The microprocessor 98 also has an output over lead 116 to a display 120 which may take the form of a CRT or other numerical display means which displays the results of the test. In the alternative or in addition to displaying the results on display means 120, one may store the results, make hard copy of the results as by a printer or use the results to initiate reject mechanisms to exclude from a conveyor defective containers.

Between pulses, the microprocessor 98 reads the voltage at Node A in lead 92 when there is no pressure applied to the system and sends a signal over lead 106 which restores the signal at Node A to zero volts employing conventional techniques.

One of the advantages of the present invention is that the pump stroke length and duration may be modified in order to adapt to the size and types of containers being tested.

In configuring the system in odder to automatically set the gain and stroke length, the operator clamps a test container on one side of the apparatus. A standard container of known volume is clamped on the other side of the system. The system is placed in an automatic standardization mode wherein the microprocessor sets the pump stroke at the minimum value and starts the pump. It reads the voltage at Node A at time t2 and retains this voltage which may be considered $V_0$. The microprocessor then switches a valve which adds a volume of exactly 0.500 fluid ounces to the reference container. The microprocessor pulses the pump again and reads a voltage at Node A at time t2. This voltage will be considered voltage $V_1$. If $V_1$ minus $V_0$ is less than 5 volts, the microprocessor increases the gain of the amplifier 84 by lead 107 until 5 volts is reached. If there is not enough available amplifier gain to reach 5 volts, the microprocessor increases the stroke length and tries the gain setting process again. This process continues until the minimum stroke length is found which will yield slightly more than 5 volts at Node A. The microprocessor 98 then reduces the gain to yield exactly 5 volts. This process establishes the minimum pump stroke usable to test a given container size thus assuring operation in the adiabatic region and also minimizing the test time.

Subsequently, the microprocessor 98 re-zeros the system by means of lead 106. As gain and zero settings are interactive, the microprocessor 98 alternately varies each of these settings to make $V_0$, i.e., the voltage at Node A without the 0.500 ounce volume added exactly zero and $V_1$, i.e., the voltage at Node A with 0.500 ounce volume added exactly 5 volts.

The final point in this automatic standardization is determination of the time when the waveform returns to zero, i.e., time t1 in FIG. 2. The microprocessor stores this time in its memory and uses it to make the initial leak or no leak determination as described hereinbefore. Next the operator removes the standard container and clamps an unknown test container in its place. When the operator places the instrument in the operate mode the display will read the difference between the volume of the test container and the volume of the standard container.

The microprocessor 98 applies a scale factor to the voltage it reads at the time t2 and displays the scaled output. The scale factor is 0.100 volts/fluid ounce for display in fluid ounces (5 volts×0.100 volts/fluid ounce=0.5 fluid ounces) and 2.96 volts/milliliter for display in metric units.

While for convenience of description, reference has been made herein and to having a volume standard means having a standard container of known volume and a test container, the volume standard means may provide other means such as a piston and cylinder in lieu of another container.

Referring to FIGS. 5 through 10, another embodiment of the invention will be considered. With the advent of molded plastic beverage bottles, there is increased need for apparatus to inspect for leakage. Typically, in such containers which may be made of polyethylene terepthalate ("PET"), manufacture is accomplished in two stages. Initially, a preform or parison is injection molded. These preforms are subsequently reheated, stretched and blown into their final shape. In some instances, a base cup is adhesively bonded to the bottom of the blown container in order to provide support and stability for the final container.

Figure 5:
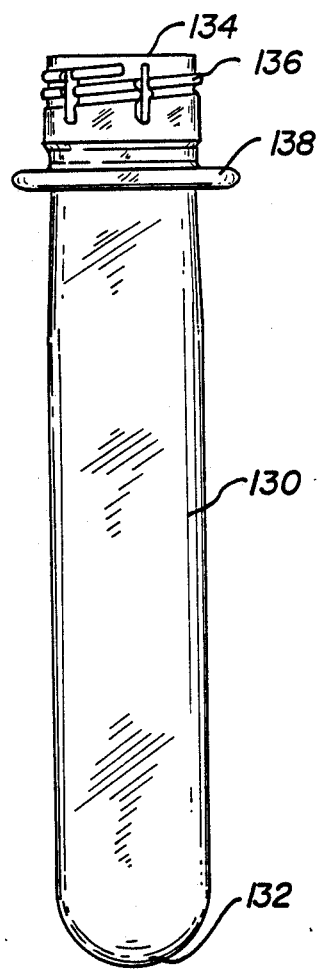
FIG. 5 is an elevational view of a container preform of the sort which may be tested by the invention.
Figure 6:
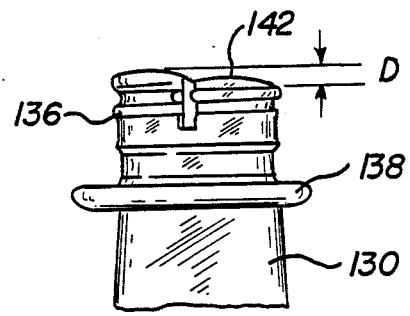
FIG. 6 is a partial illustration of a preform of the type of FIG. 5 only having a leak type defect.

A common problem is that defects in the injection molding process which creates the preform are carried through into the final container. In order to minimize the difficulties caused by a defective preform it is highly desirable to effect inspection for leaks at this stage. Shown in FIG. 5 is a preform such as is used in the manufacture of molded plastic beverage bottles. The preform consists of a closed tubular member having a body portion 130 with a closed end 132, a flat annular mouth 134, external threads 136 for securing a closure to the completed container and an enlarged annulus 138 which serves to facilitate ease of handling of the completed, filled container. Many of the defects which occur in preforms, occur along mouth or sealing surface 134. For example, referring to FIG. 6, there is shown a preform having a leak creating depression 142 which causes the mouth to have a portion of reduced height by dimension "D". As this preform would result in a defective beverage bottle were it not removed from the system, it is frequently desirable to test solely for leakage. In this embodiment of the invention, very rapid testing for leakage but not volume is contemplated.

Figure 7:
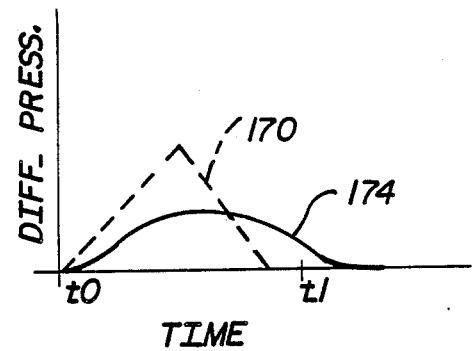
FIGS. 7 through 9 are plots of differential pressure as against time for various types of leak detection tests.

As is shown in FIG. 7, the plot of differential pressure verses time as measured by pump displacement during a pulse provides a generally triangular curve 170. The differential pressure curve 174 of a test container shows that container with a small leak as there is a meaningful pressure differential. In lieu of looking at the voltage at the time t1, the voltage level at anytime during the pump stroke is compared to the threshold level. As a result, more rapid processing of the containers is permitted. It is noted that the curve has a positive value at time t1.

Figure 8:
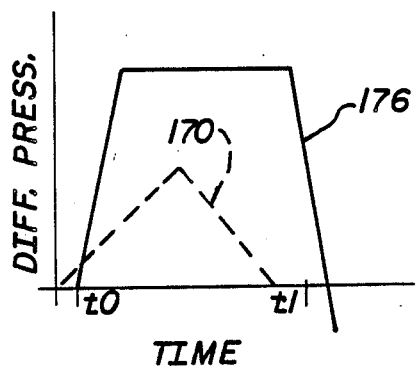

Referring to FIG. 8, there is shown the pump displacement curve 170 and a curve 176 which indicates a container with a large leak. Curve 176 has a much greater amplitude than curve 174.

Figure 9:
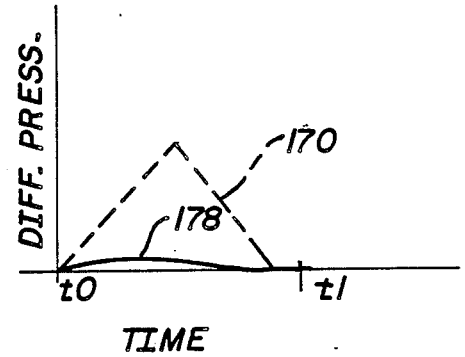

Referring to FIG. 9, there is shown a container which has no leaks. The value of the curve at time t1 is 0 and the amplitude of the curve 178 throughout is zero or nearly zero.

It will be appreciated that in this manner, rapid inspection of preforms may be performed for leakage characteristics at the mouth of the preforms as well as leaks of meaningful size in other parts of the preform.

One advantage of this embodiment is that the reading may be taken at any time between t0 and t1, The reading does not have to await arrival of time t1 as in the other embodiment. This facilitates rapid testing for leaks.

This embodiment of the present invention is capable of measuring for leaks as small as about 0.025 inch diameter at speeds of 20,000 preforms per hour.

Figure 10:
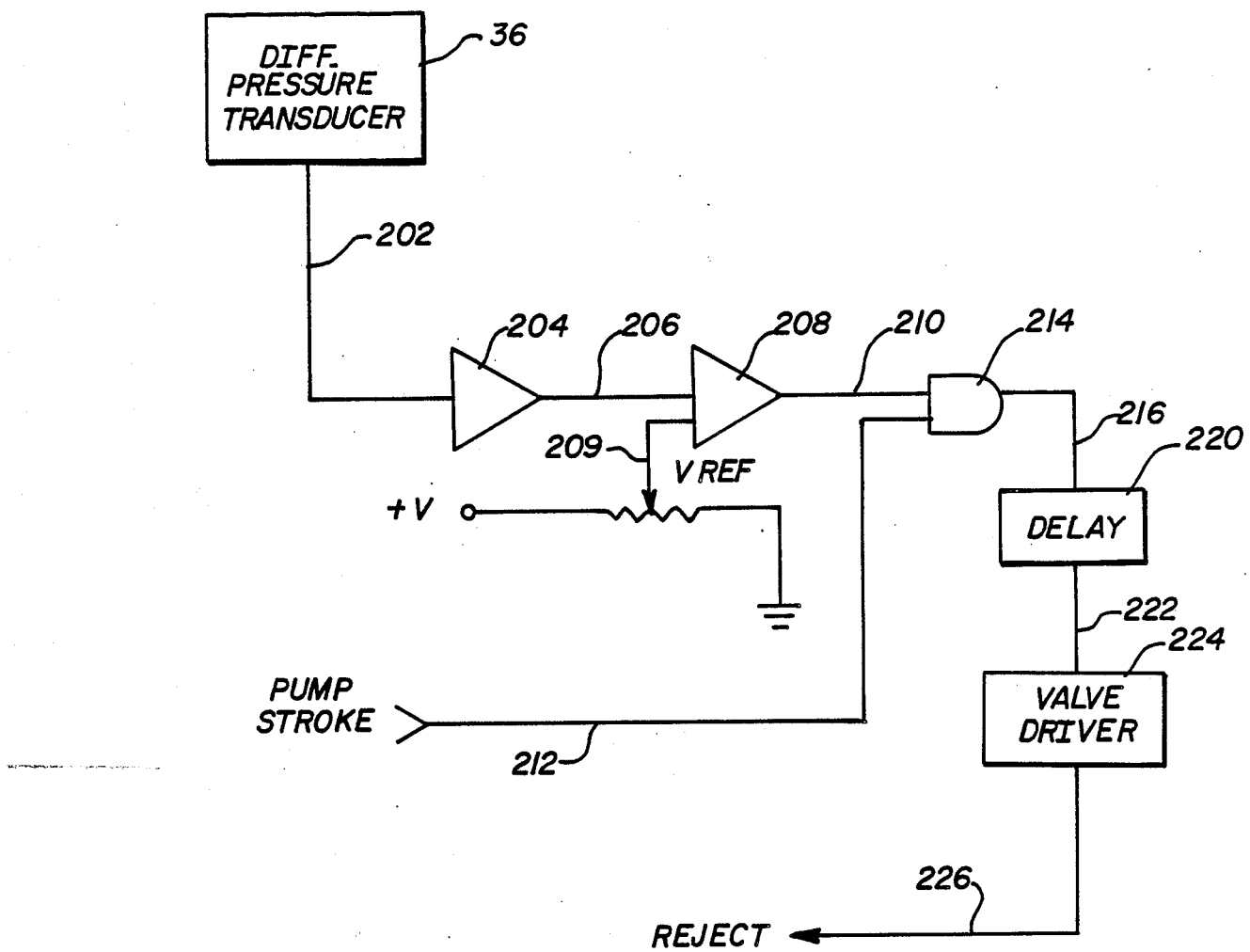
FIG. 10 is a schematic illustration of a form of electronics useable with the leak detector apparatus and method of the present invention.

Referring to FIG. 10, there is shown electronics which may be employed in this embodiment of the invention. The differential transducer 36 (FIG. 1) emits its output signal over lead 202 to amplifier 204 which, in turn, emits the amplified signal over lead 206 to the voltage comparator 208. The voltage which is proportional to the differential pressure is amplified and zero referenced in the amplifier 204. Lead 209 provides a reference voltage to voltage comparator 208. The pump stroke is established by stepper motor 14 (FIG. 1). The stepper motor 14 operates at about 1,000 steps per second, for example, with each step corresponding to 0.05 cubic inches of pump displacement. A single pump stroke may consist of about 10 to 30 steps in the direction of increasing pressure followed by a like number of steps in the direction of decreasing pressure. The pump may, for example, be of molded rubber rolling diaphragm type such as the pump sold under the trade designation Bellofram by the Bellofram Corporation.

A controlled leak such as at 21 (FIG. 1) may be placed in the pump and sized as to minimize response time of the system in the interest of maximizing the test rate.

The comparator output 208 is provided to one input of the AND gate 214 by lead 210 and the input over 212 provides the AND gate with information that the pump is in a stroke stage. The output of the and gate 214 is used to drive a reject mechanism (not shown). The output is provided by lead 216 to a delay 220 which, in turn, over lead 222 causes a valve driver 224 to initiate a signal over 226 to reject a defective container. The reject mechanism may be of any conventional type.

In calibrating this embodiment of the invention, a preform with a leak of minimum rejectable known size is placed in the test position and the threshold of the comparator 208 V REF is varied until the known leak just trips the voltage comparator 208.

While this embodiment has been disclosed in connection with leak detection of preforms, it will be appreciated that it is not so limited as it may be employed in leak detection of a wide variety of containers.

It will be appreciated, therefore, that the present invention provides apparatus and an associated method for rapidly and effectively using pressure pulses to determine either solely leakage or both leakage and volume of a container being inspected. All of this is accomplished in an economic manner under adiabatic conditions.

It will be appreciated that the plots of differential pressure versus time as shown in FIGS. 2, 3, 7, 8 and 9 represent both the mechanical pressure and a corresponding voltage plot.

Whereas particular embodiments of the invention have been described above for purposes of illustration, it will be evident to those skilled in the art that numerous variations of the details may be made without departing from the inventions as defined in the appended claims.

We claim:

1. Apparatus for testing containers comprising
   volume standard means for comparison with the container being tested and being of generally the same interior volume as the container being tested,
   pump means for applying a pressure pulse to the interior of the container being tested and said volume standard means,
   first conduit means for connecting said pump means with said test container,
   second conduit means for connecting said pump means with said volume standard means,
   acoustic impedance means for facilitating obtaining a pressure differential between said volume standard means and said container being tested interposed between said pump means and said test container and between said pump means and said volume standard means,
   differential pressure measuring means operatively associated with said test container and said volume standard means for monitoring the pressure differential between said test container and said volume standard means and emitting a signal corresponding to said pressure differential, and
   electronic processing means for receiving said signals from said differential pressure measuring means and determining if said test container leaks.

2. The apparatus for testing containers of claim 1 including
   said electronic processing means having means for determining if said test container has the desired volume.

3. The apparatus for testing containers of claim 2 including
   said electronic processing means having means for testing for volume only if a leak is not present.

4. The apparatus for testing containers of claim 2 including
   said volume standard means being a standard container having the desired volume.

5. The apparatus for testing containers of claim 4 including
   said pump means having means for applying pressure pulses substantially simultaneously to said test container and said standard container.

6. The apparatus for testing containers of claim 5 including
   said standard container being of generally the same shape as said test container.

7. The apparatus for testing containers of claim 5 including
   said pump means having means for effecting said pulses sufficiently rapid as to perform said testing under substantially adiabatic condition.

8. The apparatus for testing containers of claim 7 including
   stepper motor means for driving said pump means.

9. The apparatus for testing containers of claim 7 including
   said acoustical impedance means having an assembly of adhesively bonded glass beads.

10. The apparatus for testing containers of claim 9 including
    said assembly of beads having a maximum dimension of about one-half to three quarter inches.

11. The apparatus for testing containers of claim 10 including
    said assembly of beads having a length of up to about three eighths inch.

12. The apparatus for testing containers of claim 10 including
    said assembly of beads having a maximum pore size of less than about 175 microns.

13. The apparatus for testing containers of claim 7 including
    said differential pressure measuring means having a differential pressure transducer.

14. The apparatus for testing containers of claim 7 including
    said electronic processing means having means for determining if a leak exists.

15. The apparatus for testing containers of claim 14 including
    said leak detecting means of said electronic processing means having means for monitoring a voltage signal corresponding to differential pressure at a predetermined time and comparing the same with a standard voltage at said predetermined time.

16. The apparatus for testing containers of claim 15 including
    said electronic processing means having volume determining means, and said volume determining means having means for comparing signal voltage at a time prior to said predetermined time with a standard voltage to determine whether the container is of the desired volume.

17. The apparatus for testing containers of claim 16 including
display means for receiving information from said electronic processing means and displaying the same.

18. The apparatus for testing containers of claim 17 including
said pump being adapted to provide pulse of about 20 to 100 milliseconds duration.

19. The apparatus for testing containers of claim 18 including
said pump having means to emit a pressure pulse which is of generally triangular shape.

20. The apparatus for testing containers of claim 19 including
means for creating a triangular plot from said pressure pulse, and
said triangular plot having a maximum amplitude intermediate the time of initiation of the pulse and said predetermined time.

21. The apparatus for testing containers of claim 19 including
said container having a capacity of about 1 to 70 fluid ounces.

22. The apparatus for testing containers of claim 21 including
said container being composed of a material selected from the group consisting of glass, plastic and metal.

23. The apparatus for testing containers of claim 17 including
means for adjusting the pump stroke length and duration.

24. The apparatus for testing containers of claim 1 including
said pump means being a constant displacement pump.

25. The apparatus for testing containers of claim 1 including
said electronic processing means having leak detection means for determining the presence of a leak by monitoring the amplitude of a differential pressure related signal from said differential pressure measuring means during the time interval between pump pulse initiation and pump pulse termination.

26. The apparatus for testing containers of claim 25 including
said leak detection means effecting said leak determination prior to said pulse termination.

27. The apparatus for testing container of claim 26 including
said leak detection means comparing the amplitude of said differential pressure with a standard level and emitting a signal indicative of the existence of a leak if said standard level is exceeded.

28. The apparatus for testing containers of claim 27 including
said leak detection means being adapted to test about 50 to 400 containers per minute.

29. A method of inspecting containers comprising
providing a pump in communication with both a container to be tested and a standard container through conduit means which contain acoustical impedance means,
providing a pressure pulse to both said containers,
monitoring the pressure differential between two locations one of which is disposed between said standard container and said acoustical impedance means and the other of which is disposed between said test container and said acoustical impedance means, and
employing said pressure differential information to determine whether said container has a leak.

30. The method of testing containers of claim 29 including
employing said pressure differential to determine if said test container has the desired volume.

31. The method of testing containers of claim 30 including
performing said tests under adiabatic conditions.

32. The method of testing containers of claim 31 including
pulsing said pump duration with pressure pulses of about 20 to 100 millisecond duration.

33. The method of testing containers of claim 31 including
determining whether a leak exists by monitoring the pressure differential at a predetermined time.

34. The method of testing containers of claim 33 including
determining whether the desired volume exists by monitoring the differential pressure at a time prior to said predetermined time.

35. The method of testing containers of claim 33 including
employing said method to test containers having a volume of about 1 to 70 fluid ounces.

36. The method of testing containers of claim 35 including
employing electronic means to produce a voltage as against time corresponding to differential pressure against time.

37. The method of testing containers of claim 36 including
employing said method to inspect containers composed of a material selected from the group consisting of plastic, glass and metal.

38. The method of testing containers of claim 35 including
employing a constant displacement pump as said pump.

39. The method for testing containers of claim 38 including
employing a pump pulse which provides a generally triangular waveform in plotting differential pressure against time from the time of the initiation of the pulse until said predetermined time.

40. The method of testing containers of claim 38 including
prior to testing adjusting the pump stroke length and duration according to the volume of the container being tested.

41. The method of testing containers of claim 33 including
providing said pump pulse generally simultaneously to said test container and said standard container.

42. The method of testing containers of claim 30 including
comparing the amplitude of said pressure differential with time during the period between pump pulse initiation and pump pulse termination in order to determine if a leak exists.

43. The method of testing containers of claim 42 including
comparing said pressure differential amplitude with a standard pressure differential amplitude to determine if a leak exists.

44. The method of testing containers of claim 43 including
repeating said testing cycle at a rate of about 50 to 400 per minute.

* * * * *